United States Patent [19]

Poland

[11] 4,050,523

[45] Sept. 27, 1977

[54] FOLDING WING DISC HARROW

[75] Inventor: Robert L. Poland, Kewanee, Ill.

[73] Assignee: Chromalloy American Corporation, St. Louis, Mo.

[21] Appl. No.: 614,372

[22] Filed: Sept. 18, 1975

[51] Int. Cl.² .................. A01B 49/00; A01B 63/32
[52] U.S. Cl. ................................ 172/311; 172/456; 172/458; 172/459; 172/468; 172/482; 172/583
[58] Field of Search ............... 172/456, 311, 458, 459, 172/468, 469, 470, 471, 482, 484, 583, 456

[56] References Cited

U.S. PATENT DOCUMENTS

| | | | |
|---|---|---|---|
| 3,692,121 | 9/1972 | Kenney | 172/456 |
| 3,693,724 | 9/1972 | Fueslein | 172/456 |
| 3,828,860 | 8/1974 | Poland | 172/456 X |
| 3,887,016 | 6/1975 | Hansen | 172/456 X |
| 3,944,001 | 3/1976 | Warner | 172/456 X |

Primary Examiner—George J. Marlo
Attorney, Agent, or Firm—Johnson, Dienner, Emrich & Wagner

[57] ABSTRACT

The invention provides a folding wing disc harrow wherein a hydraulic operating mechanism is provided for folding and unfolding the wings through an arc of more than 180° through the positive bidirectional linear movement of the plunger of a double acting hydraulic cylinder cooperating with the wing to which it is connected, for said folding and unfolding operations, and which mechanism allows a limited angular free floating motion of the wing above and below the horizontal "unfolded" or "working" position when the hydraulic control valve is set accordingly. The connection of the hydraulic piston rod with the wing is so organized that the straight line motion of the piston rod is enabled to fold and unfold the wing through an arc well in excess of 180° and is organized to allow a limited free floating action of the wing for following the soil surface variations.

The ability of the present invention to swing the wing through 180° of angular motion for folding and unfolding the wings about a horizontal longitudinal hinge axis by a simple straight line hydraulic cylinder motor operation allows a uniquely compact and stable folded condition of the implement which is advantageous and highly desirable. Dispensing with the necessity for balancing springs, which is an undesirable feature common in the prior art, marks the present invention as a distinct advance in the art.

11 Claims, 11 Drawing Figures

FOLDING WING DISC HARROW

BACKGROUND OF THE INVENTION

Agricultural implements such as disc harrows having a tool supporting wing that can be folded over the main tool supporting frame are known. The folding feature is desirable for transport and storage. Provision of that feature is subject to the requirement that when the harrow, or like implement, is in operation each wing must have a certain degree of freedom of motion up and down, relative to the main body, to adapt its operation to the contours of the ground surface under treatment. While in the present embodiment the setting of the depth control is common to both wings and the main body of the machine, this may be varied without reference to the present invention.

The raising and folding and the unfolding and lowering of the wings of a wing disc harrow by hydraulic controls from a pulling tractor by the present invention is simple and dependable and does not interfere with the ability of the wings and the main body section to perform on varying contours and consistencies of the soil to be operated upon. It is fully controllable as to depth of operation by known means, preferably in the form of ground engaging wheels which, by their common setting, control depth of operation and are controlled by the operator on the operating tractor, preferably by hydraulic control. These desirable control features are understood in the art.

SUMMARY OF THE INVENTION

The invention provides a folding frame disc harrow or like implement with a hydraulic control and adjusting mechanism involving a mechanical linkage between the wing frame and the main frame and a pair of double acting hydraulic cylinders for individually folding and unfolding each of the wings. A linkage between the hydraulic cylinder plunger and the subject pivoted wing controls positively the raising and folding and unfolding and lowering motions of the wing by a hydraulic pressure system operating through a linkage which counteracts the tendency of the load—that is, the weight of the wing—to run ahead of the hydraulic plunger in swinging over center. The linkage, after the wing has been carried part of the way, employs differential motion of two or more of the parts to produce its effect at a shorter radius, but through a larger angular motion to enable the straight line motion of the hydraulic piston to swing the wing frame through an angular motion in excess of 180° without losing positive control of the movement or position of the wing.

Each wing frame is connected to the main frame through a closed linkage system operating on two separate pivots. Through the use of a double acting hydraulic plunger member, the wing frame on the side of the main frame way be unfolded from its inverted horizontal folded or rest position overlying the main frame by being turned over and disposed in a generally horizontal working position with a permitted freedom to swing about a longitudinal horizontal working axis disposed at a level below the level of the main or folding axis.

The soil engaging discs are mounted for rotation on horizontal axes disposed at a suitable angle to the forward direction of the implement, in known manner. The depth of cut of the discs is controlled in known manner by adjustable height control governed by ground engaging wheels in known manner.

The pivoting of the wing frame on each side for rise and fall, according to the contour of the field surface, occurs about the lower end of a main operating link which extends from the main hinge axis which is mounted on and disposed preferably a short distance above the level of the top of the main frame, down to a wing hinge arm pivot on a bracket rigid with the adjacent wing frame member the plane of which is parallel to the plane of the main longitudinal frame members, of the main frame unit, when the wing frame is unfolded and the main frame and the wing frame are on level ground, and also when the wing frame is folded back over the main frame. The main operating link is held in its unfolded position by gravity and the adjusted inactive or locked position of the hydraulic cylinder.

To raise and fold the wing back over the main frame requires that the compound hinge must be allowed to fold to a predetermined angularity and thereupon be rigidified when the wing supporting arm has attained an angularity at which the wing approaches an overbalance relative to its fold pivot pin where it would tip over in a forward direction toward the adjacent main frame before the approaching adjacent edge of the wing has registered vertically with the adjacent edge of the main frame, in the act of turning over on the top of the main frame.

The invention provides a folding wing disc harrow wherein a double acting link between the main frame and the wing is utilized, whereby folding of the wing back over the main frame occurs on a fixed first hinge or pivotal axis positioned above the horizontal plane of the guided plunger of the hydraulic operating cylinder and above the plane of the main frame, whereas the swinging of the wing to follow the field contour is made to occur about a generally parallel second hinge axis or pivot located below both the wing and the plane of the supporting main frame structure.

The wing frame is connected to the main frame through a linkage system operating successively on two sets of pivots whereby, through a straight line operating plunger member, the wing frame on the side of the main frame may be unfolded from its rest position overlying the main frame in a horizontal position, to be disposed in a generally horizontal working position with freedom to swing to a limited extent about a horizontal axis. The axes of the working discs are disposed in a plane parallel to the plane of the frame on which they are supported.

Broadly speaking, the hinge linkage mechanism provided by the present invention first wraps the inner edge of the wing operating linkage about the axis of connection to the main frame, to fold, and unwraps the free edge of the wing first, to unfold, and lower the wing.

OBJECTS OF THE INVENTION

It is the chief object of the invention to provide a hydraulic operating and control system which, with the aid of a mechanical switching system, provides the means for keeping control of the heavy gravity load of the wing which has freedom to rise and fall to follow the contour of the terrain, and which wing must be swung upwardly and back over and beyond center and laid on its back without loss of control to the influence of gravity.

A further object of this invention is to provide a combination manually controlled, hydraulic pressure operated, and cam controlled system for swinging the heavy pivoted wings of a disc harrow from idle folded position out over center and then, by cam mechanism, brought into action by said preceding movement, controlling the rate of descent of the load to effect a transfer of said load to a desired supporting medium which may be the back of the main section or it may be ground. This is accomplished by interposing the operation of a controlling cam and/or linkage at an angular position of the wing where the reverse load of the lowering motion of the swinging wing comes into effect.

It is a further ojbect of the invention to provide a compound hinge connection between the side frame member of the main frame and the adjacent side frame member of the wing frame, which connection will allow the wing frame to be turned over on its back upon the main frame. This is done through the operation of a wing hinge link which is pivotally connected to a wing frame arm which is rigid with the wing frame, and a link which serves initially as a tension link to hold the wing frame temporarily in a predetermined angular position relative to the wing hinge lever, and then as the wing frame approaches vertical position this link serves as a cam or strut to hold the wing frame from falling forward over the edge of the main frame until the wing frame hinge axis has been swung over the adjacent edge of the main frame at a suitable radius and in position to register vertically with the side edge of the main frame.

It is a further object of the present invention to provide a wing disc harrow comprising a main disc carrying frame and companion wing disc carrying frames with hydraulic operating mechanism for folding the wing upside down back over the main frame by hinge means along one longitudinal edge of the main frame and the adjacent wing frame and wherein said hinge means is actuated by a double acting hydraulic cylinder, the first or lowering stroke of which swings the wing on said hinge means to bring it with face down upon the ground along side of the main frame and releases it for engaging the working surface of the wing with the ground alongside the main frame, the reverse operation of said hydraulic operating mechanism raising said wing on said hinge means along the edge of the main frame and swinging the inverted wing frame upon the top of and parallel to the main frame.

BRIEF DESCRIPTION OF THE DRWAINGS

DESCRIPTION OF THE PREFERRED EMBODIMENT

Figure 1:
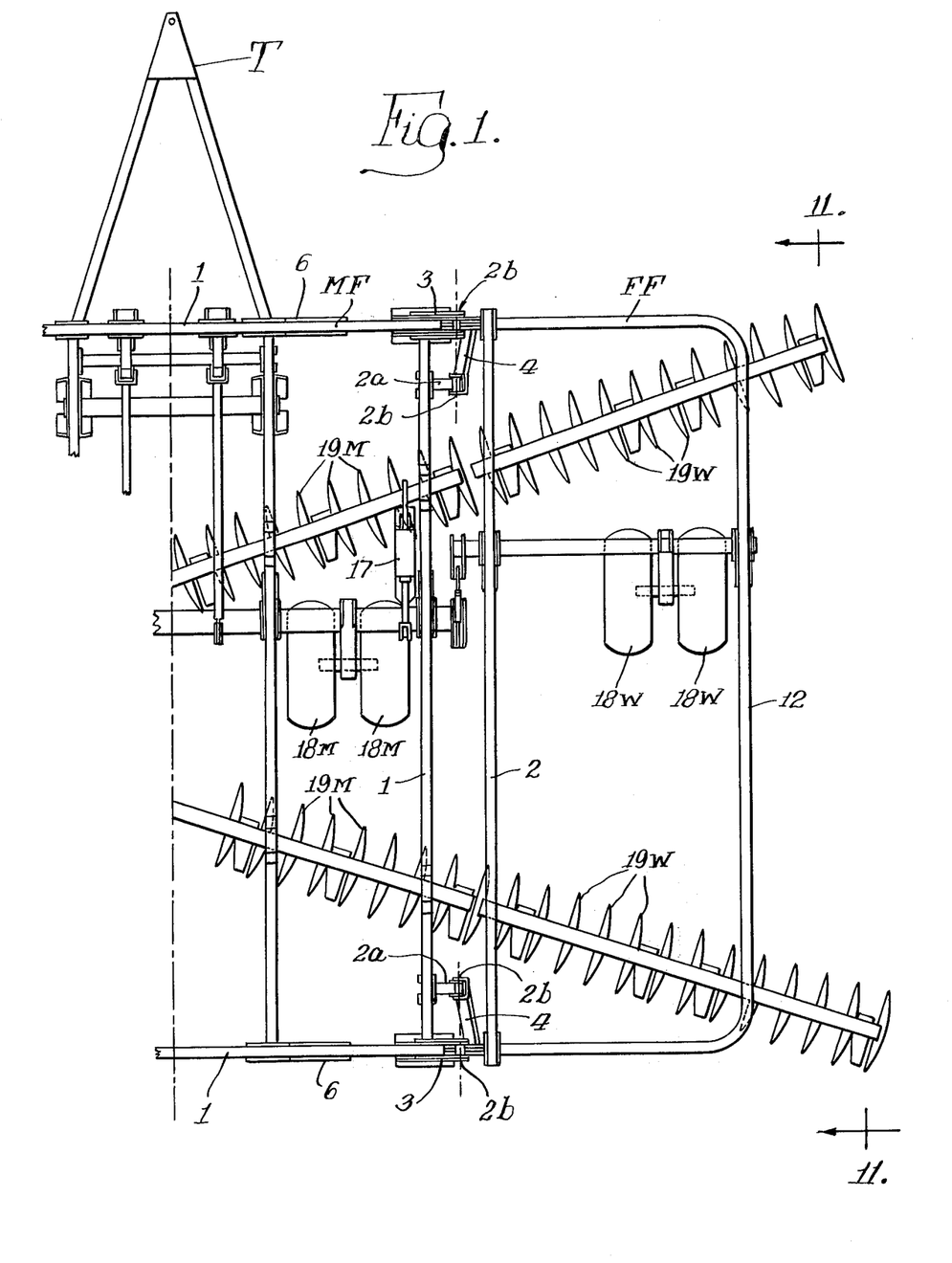
FIG. 1 is a top plan view of the major operating parts of the right hand half of a harrow of this invention; the left hand half of this illustration is omitted to avoid duplication and to allow illustration of half of a center section and one connected wing, on a larger scale; the hitch to the operating tractor comprises the inverted V-shaped tongue T at the top of FIG. 1.
Figures 10, 11:
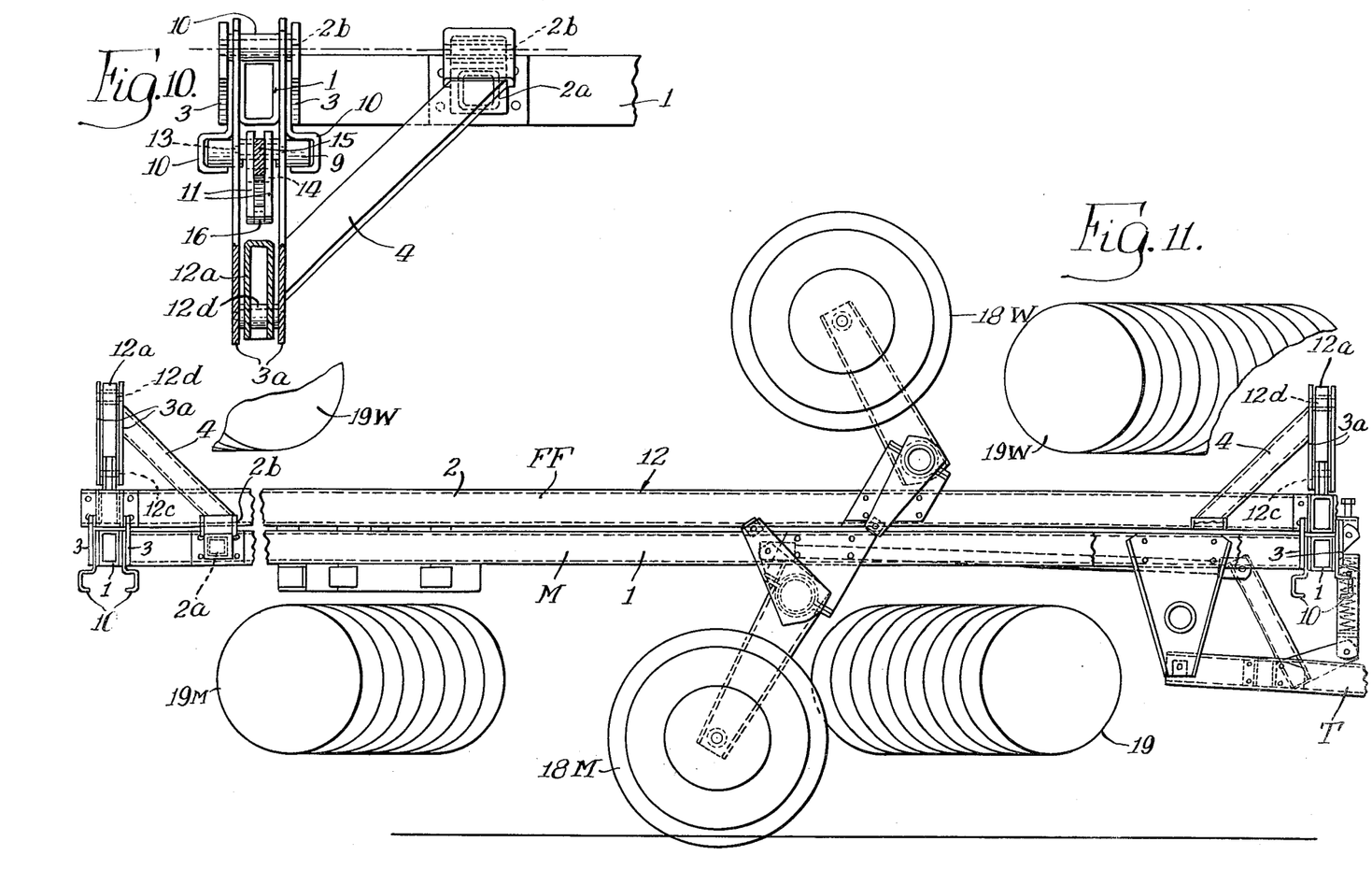
FIG. 10 is a detailed sectional view taken on the line 10—10 of FIG. 3.
FIG. 11 is a right side elevation of the harrow of the present invention with the right hand wing folded up.

Referring first to FIGS. 1 and 11, an agricultural implement such as a harrow comprises a main or central frame MF and two wing frames FF of which only one of the latter is illustrated in FIG. 1. (They are, left and right, otherwise alike.)

Figures 2, 3, 9:
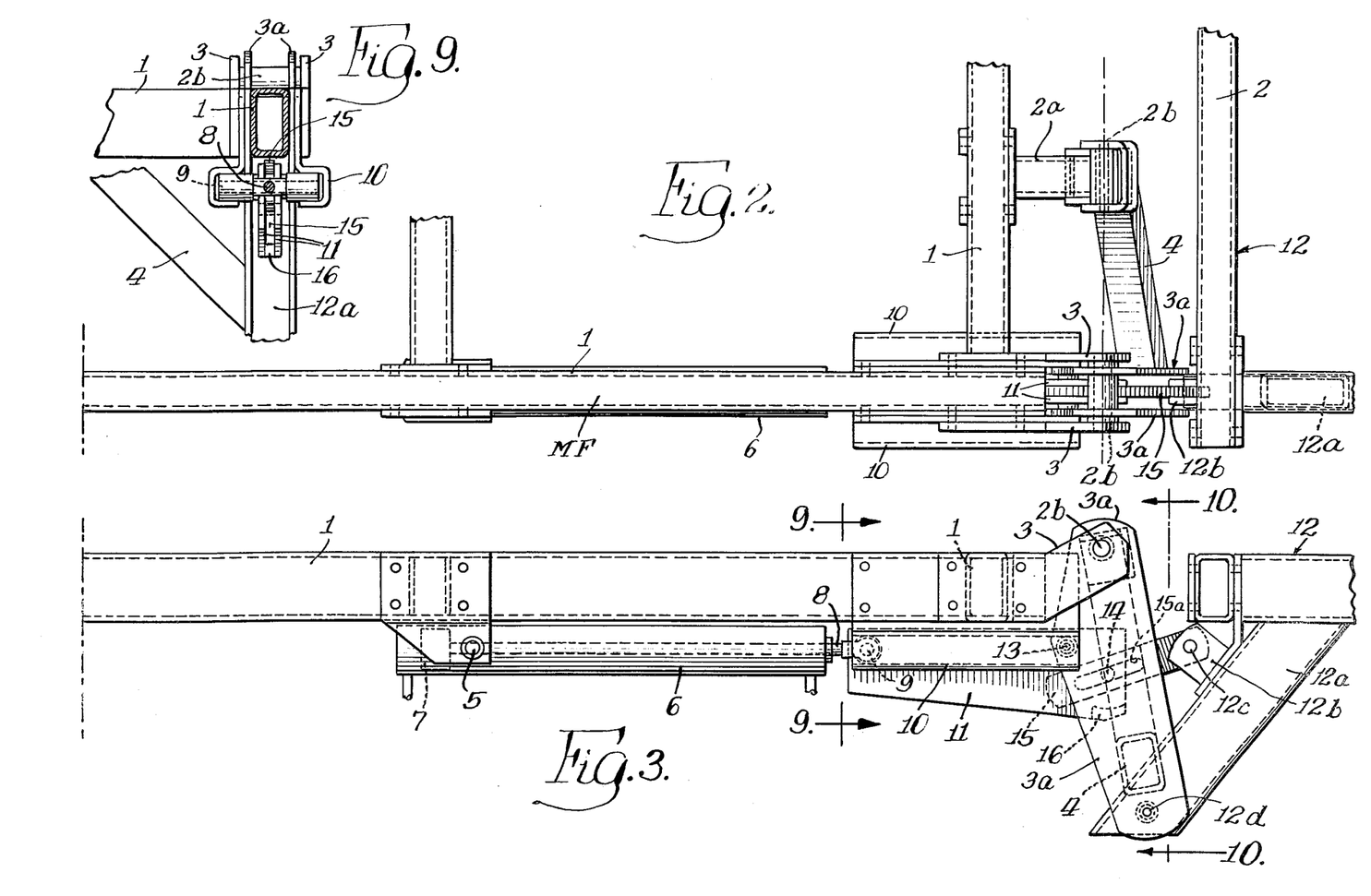
FIG. 2 is a fragmentary top plan view of the right rear hinge between the wing, the main frame, and the actuating mechanism for manipulating the wing frame, the same view on a smaller scale appearing at the bottom center of FIG. 1.
FIG. 3 is a side elevation, viewed from the bottom of FIG. 2, showing the operating and control mechanism for the hinge, illustrated in plan view in FIGS. 1 and 2, when the wing is disposed in operating position.
FIG. 9 is a cross sectional view of the detail of the guide for the plunger rod 8 taken on the line 9—9 of FIG. 3.

The main or central frame MF (FIG. 1) has, adjacent the ends of each of its side bars 1, main frame hinge brackets 3, 3 the hinge or pivot pins 2b of which pivotally support the upper ends of wing hinge levers 3a, 3a (FIGS. 2 and 8) at each end of the main frame, and auxiliary hinge brackets 2a, 2a on the longitudinally extending main frame side bar 1 and cooperating diagonal bracket arms 4 (FIGS. 1, 2, 3).

The wing hinge levers 3a, which are constituted initially as third class levers for the purpose of initially raising the wing frame from support by the ground, are adapted to have force applied to them by the plunger rods 8 at pivot pins 13 located intermediate the ends of said wing hinge levers 3a. The force applying means on each side of the frame comprises a double acting cylinder 6 disposed—one at each side, front and back, of the main frame MF—with pistons 7 and piston rods 8, which rods 8, with connecting thrust bars or links 11, are each guided in a horizontal track or guide 10 (see FIGS. 3 and 9), said cylinders 6 being mounted on pivots 5 on the lower side of the main frame side bar 1.

The hinge or crosshead pin 9 of each piston 7 is connected to its thrust bar or link 11 which is guided in a horizontal track 10 (FIG. 9) fixed to the lower side of the main frame bar 1 (see FIGS. 3 and 9). The lever 3a assumes whatever position is required by the position of its pivot pins 2b, 12d and 13. Its function is to transmit thrust of the hydraulic piston 7 in one direction and tension or pull of the hydraulic plunger operating in the opposite direction. The piston 7, through the aforementioned intermediate flat, plate like link 11, is connected to the wing hinge arm 3a at pin 13 and guide-mounted in guideway 10 (FIG. 9). The piston 7, through its extension 8, 9, 11, is pivotally connected at 13 intermediate the ends of the wing hinge lever 3a, and during operation of the harrow said lever 3a is disposed in a generally vertical position, the wing 12 being then in substantially the normal operating, horizontal position illustrated in FIGS. 2 and 3. The wing frame 12 at that time assumes the position shown in FIG. 3 with the wing frame 12 moving endwise, that is, to the plane of the paper in FIG. 3 in substantially the same plane as that in which the main frame MF in FIG. 1 lies.

The linkage is so proportioned as to allow tilting of the wings sidewise relative to the main frame above and below the line position shown in FIG. 3 to the extent permitted by the pin 14 in the slot of link 15.

If, with the parts in the position shown in FIGS. 1, 2 and 3, it should be desired to fold the wing frame FF of FIG. 1 over upon the main frame MF, the following operations are effected. The operator has in the cab of the pulling tractor hydraulic equipment providing a fluid pressure supply and a manual control valve. Admission of pressure fluid to the left hand end of cylinder 6 in FIGS. 2-8 initiates a folding operation.

Referring particularly to FIGS. 2 and 3, the parts are in normal unfolded position with the wing frame 12 supported on level ground by the depth control wheels 18M, 18M (FIG. 1). The main frame MF is supported partly upon its discs 19M which are held at a predetermined depth by the downward weight of the machine and held to a predetermined depth value by the ground engaging wheels 18M, 18M, the position of which is controlled by the cylinder 17 (FIG. 1).

The operating position of the unfolded discs 19W with respect to the ground line, is such as to provide the desired depth of penetration, and the hydraulic depth control cylinders 17 (FIG. 1) are set accordingly. When the desired depth of penetration of the discs is duly adjusted, the harrow is moved by the tractor in a soil working or plowing operation.

With the wing disc harrow moving over level ground with the discs set to penetrate the soil to a predetermined depth, the main frame of the machine will be substantially level at a depth of penetration of the discs controlled by the wheels 18M. Adjustment of the wheels under the wing frame and the wheels under the adjacent side of the main frame is effected by the hydraulic piston and cylinder 17 as shown in FIG. 1. The other half of the main frame and its adjacent wing frame, which are not shown in FIG. 1, will however have a similar arrangement for controlling the depth of penetration of the discs for the wing and for the adjacent main frame portion of the machine. In normal operation, which is above briefly described in connection with FIG. 1, the position of the folding and unfolding mechanism of the individual wings maintains substantially the position of the parts illustrated in FIGS. 2, 3 and 9. In this condition the main frame 1 shown in FIGS. 2 and 3 is substantially level and the wing frame 12 likewise is in a level position in line with the main frame. The opposite side of the main frame and its connected wing frame is the same as that shown in FIGS. 2 and 3 for the right hand side of the machine—that is to say, the right hand side and the left hand side are mirror images of each other.

The main frame MF as shown in FIGS. 1 and 11 and the wing frame 12 (see FIGS. 1 and 3) are horizontally in alignment being connected through the lever 3a hinged at its upper end at the pin 2b of the upwardly extending hinge bracket or lug 3. At this time the plunger 7 of the hydraulic cylinder 6 is retracted—that is, moved to the left in FIG. 3—holding the link 3a against movement through the thrust link or bar 11 which is hinged at 13 to the link 3a. The wing Frame 12, however, is to some degree independent of the main frame in that the connection between the two is through the bracket arm 12a and pin 12d at the lower end of lever 3a.

The slotted link 15 which is pin hinged at 12c to the wing frame bracket 12a carries the slot 15a and the pin 14 in the said slot approximately midway of the length of the slot. Thereby the wing frame may rise and fall to the extent determined by the aforesaid pin and slot connection. The position of the wing hinge lever 3a is maintained by the hydraulic cylinder and plunger which operates with a liquid which is comressible.

FOLDING OPERATION

Figures 4, 5, 6, 7, 8:
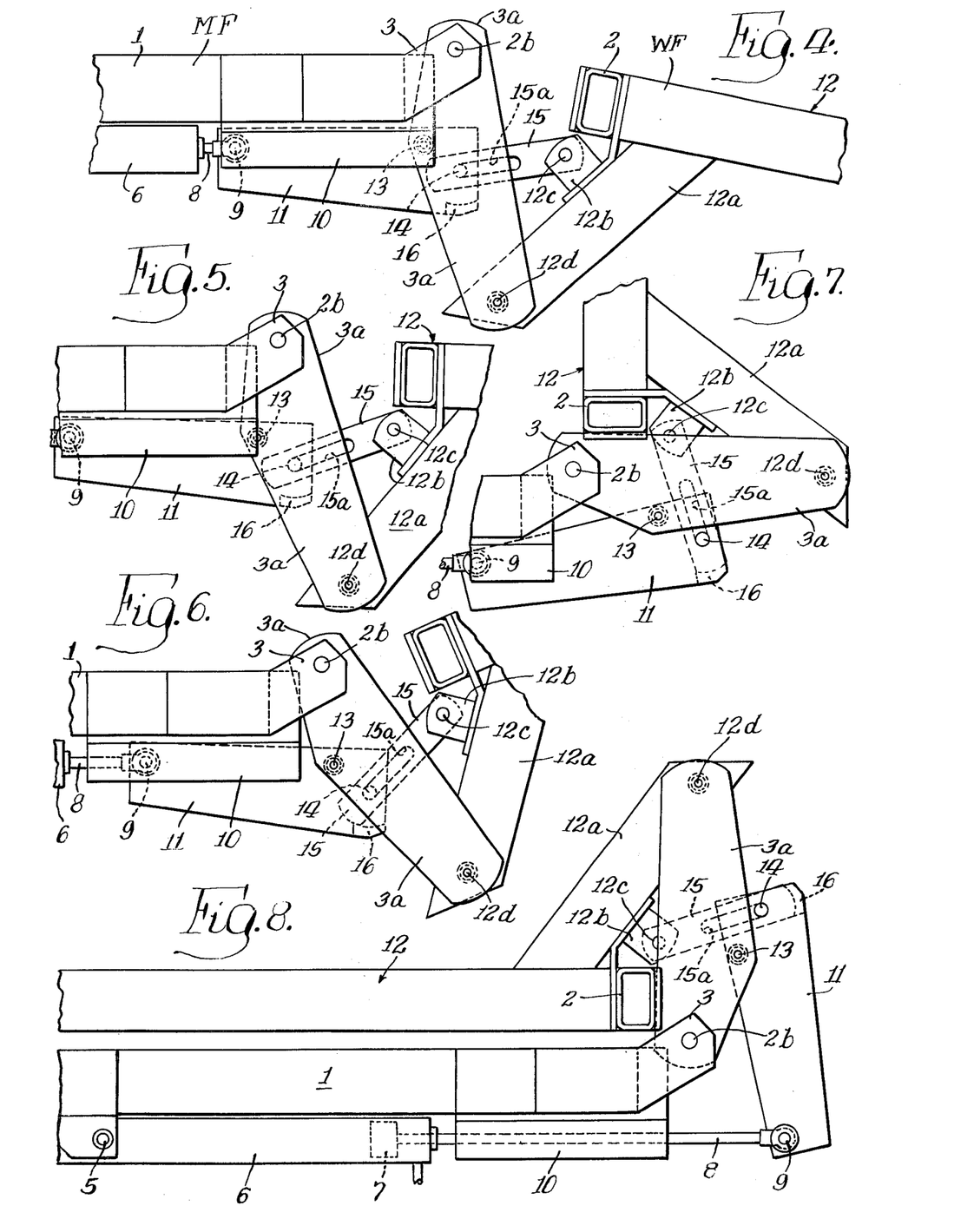
FIG. 4 is a side elevational view of the parts shown in FIG. 3 at the beginning of a wing folding operation.
FIG. 5 shows the next stage in the operation of swinging the wing frame upwardly for folding.
FIG. 6 is a side elevational view similar to FIGS. 4 and 5 showing the next step of folding up of the wing frame to the stage where the suspension arm 3a of the wing frame and the link from the center frame to the bracket of the wing frame are locked together for rotary motion about the fold pivot 2b of the main frame.
FIG. 7 shows the parts comprising the connection between the main frame and the wing frame, with the wing frame swung upwardly into substantially vertical position in its travel counterclockwise towards swinging over onto the top of the main frame.
FIG. 8 shows the parts in the position where the wing frame has been carried up over center and folded parallel to and onto the main frame.

Reference is now had to FIGS. 4-8. The first step in folding the wing frame over the main frame comprises an elevation of the main frame MF by way of the ground engaging wheels so that the wing frame FF may rock on the pin 12d, as shown in FIG. 4, to cause the pin 14 which is carried on the thrust bar or link 11, connected to the hydraulic cylinder 6, to move to the end of the slot 15a so that there is a solid connection between the wing frame and the link 3a to prevent further clockwise movement of bracket arm 12a around the pin 12d to hold the wing frame FF in a predetermined position as illustrated in FIG. 4. Then operation of the hydraulic cylinder 6 thrusts bar 11 to the right as shown in FIG. 4. The wing frame and the main hinge lever 3a, being held together by the link 15 and pin 14, can be rotated together by movement of the piston rod 8 of the cylinder 6 to the right in FIG. 4. This movement, transmitted through the pin 13 to the wing hinge lever 3a, swings the wing frame 12 in a counterclockwise direction to the position shown in FIG. 5. Thus by extension of the piston rod, the main lever 3a and the wing hinge bracket 12a with the connected wing frame 12 will be moved counterclockwise around the pin 2b as a pivot. As movement of the piston 7 of the hydraulic cylinder 6 proceeds, the connected parts above referred to will continue to swing around the pin 2b on the main frame as shown in FIG. 6.

As the rotary movement of the wing frame around the pivot pin 2b continues, a point will shortly be reached, as illustrated in FIG. 7, where the center of gravity of the wing frame and its connected parts will swing the wing counterclockwise back over the hinge pin 2b of the main frame, and the wing frame 12 will tend to fall prematurely counterclockwise on its face since its center of gravity is at that stage on the left hand side of the pivot 2b on the main frame, as shown in FIG. 8. This, however, is prevented by the two point hold which the thrust bar or link 11 has on the wing frame 12 through the slotted link 15 and arcuate shoulder 16 to prevent counterclockwise motion of the wing about the hinge pin 12b and the restraint against backward angular motion prevented by the resistance of the arcuate shoulder 16 on the thrust bar 11 which can be unlocked only by movement of the slotted link 15 swinging away from the arcuate shoulder 16.

FIGS. 4—8 illustrate the face that throughout the entire operation of swinging from normal horizontal position illustrated in FIG. 3 to inverted horizontal position illustrated in FIG. 8 the wing frame 12 is under the control of the hydraulic cylinder, no free fall being permitted.

The unfolding operation is equally under control and it begins with reverse operation of the cylinder plunger 7 to the left as shown in FIG. 8 to unwind, as it were, the wing frame controls around the main frame hinge pivot 2b in successive reverse positions illustrated in FIGS. 7, 6, 5, 4 and 3.

FUNCTION OF THE ARCUATE SHOULDER 16

In the above outline of the folding operation, the essential locking function of the slotted link 15 and the arcuate shoulder 16 have been stated briefly. It is essential to the folding operation that the hinge 12d between the wing frame and the main lever 3a be rigidified when the center of gravity of the wing frame moves counterclockwise toward a position vertically above the supporting pin 12d. This requirement is met by the cooperation of the slotted link 15 hinged at its upper end at 12c to the wing frame and the arcuate shoulder 16 on the thrust bar 11 which connects the plunger of the cylinder with the main operating link 3a through the pin hinge 13.

When the parts are in the position shown in FIG. 3 the wing frame 12 is being supported by the ground wheels and is free to move up and down within the limits of the slot 15 and pin 14 shown in FIG. 3.

In the operation of swinging the wing frame to its idle or rest inverted position (FIG. 8) from its working position (FIG. 3) with the plunger of the cylinder in maximum retracted position, the linkage between the main frame and the wing frame initially occupies the position shown in FIG. 3. Admitting fluid to the left hand end of a cylinder, as shown in FIG. 3, swings the main lever 3a counterclockwise and this tends to push the wing hinge arm 12a and the frame 12 diagonally upwardly to the right as viewed in FIG. 5. This results in decreasing the angle between the main operating lever 3a and the wing frame strut 12a as shown in FIG. 4. This action is limited by the pin 14 engaging the end of the slot 15a as shown in FIG. 4. Further movement of the link 11 to the right in FIG. 4 begins to swing the main lever 3a and wing frame bracket 12a together since the pin 14 on the plunger bar or link 11 has reached the end of the slot, as shown in FIGS. 4 and 5, and the further movement of the plunger begins to swing the main lever 3a and the wing frame 12 as a unit in a counterclockwise direction, as shown in FIG. 5. Further movement of the parts illustrated in FIG. 6 shows the thrust bar or link 11 further advanced to the right which swings the wing hinge 3a and the wing frame 12 together as a unit in a counterclockwise direction. The wing frame 12 tends, under its own weight, to swing about the pivot 12d in a clockwise direction but is restrained from independent movement in that direction by the slotted link 15 engaging the pin 14 on the thrust bar 11. However, if this motion is continued to the point where the wing frame center of gravity would tend to pass over the hinge pin 12d, the wing frame would then flop over counterclockwise. The pin 14 and slot 15a would not be able to prevent this. However, in the present construction, the arcuate shoulder or lug 16 which is affixed to the thrust bar or first link 11 now engages the arcuate end of the second link 15 as shown in FIG. 6. Thereby the wing frame and its bracket arm 12a are held against counterclockwise movement with respect to the main lever 3a which is connected at the hinge pin 13 to the thrust bar or first link 11 and connected to the wing frame bracket 12b of the wing frame. Thereby further movement of the thrust bar or link 11 to the right in FIG. 6 results in moving these three elements—namely, the wing hinge lever 3a, the bracket arm 12a and the slotted link 15a, together in unison. Angular advance of the thrust bar or link 11 is continued and it moves the linkage and the wing frame 12 into the position shown in FIG. 7. Continuing movement of the thrust bar or link 11 brings the parts through the position shown in FIG. 7 to the position shown in FIG. 8 where the folding motion of the wing frame has been completed. When both wings have thus been folded over on top of the main frame, the implement is in condition to travel.

In this operation, the first link or thrust bar 11 performs simultaneously a number of important functions. First, it transmits the actuating thrust of the hydraulic plunger rod 8 tending to swing the wing frame counterclockwise around the stationary main pivot 2b, then through the pin 14 and slot 15a of the link 15, it holds the wing frame at a predetermined angle relative to the main lever 3a. Then for the final fold it acts as a strut through the arcuate shoulder lug and link 15 to swing the wing frame the last 90° to bring it face down on top of the main frame.

For unfolding of the wings, the hydraulic pressure is applied on the right hand side of the piston 7 in FIG. 8 and the unfolding operations proceed in reverse through the stages illustrated in FIGS. 8, 7, 6, 5, 4 and 3.

I claim:

1. In an agricultural implement having a horizontally disposed tool supporting main frame, a tool supporting wing frame hinged to one side of the main frame to swing on a fixed hinge axis between a generally horizontal inverted rest position over the main frame and a generally horizontal working position outboard of the main frame, and extensible-retractable push-pull means to effect said swinging of the wing frame, the improvement wherein the wing frame is hinged to the main frame by a compound hinge connection which includes a lever having one end hingedly connected to the main frame to swing on said fixed hinge axis and having its opposite end hingedly connected to the wing frame to swing on a second hinge axis speced from said fixed hinge axis and parallel thereto, said compound hinge connection further including a thrust link pivotally connected to said level intermediate its hingedly connected ends, the thrust link being also pivotally connected to one end of the push-pull means, and a second link having one end pivotally connected to the wing frame, said second link containing a closed longitudinally extending slot spaced from its pivotal connection to the wing frame, the thrust link having an anchor pin slidably confined in said slot such that the wing frame when in its generally horizontal working position is free to swing within a limited angle about the second hinge axis to follow field contour, the outboard end of the slot in the second link being engaged by the anchor pin of the thrust link to retain the wing frame against rotation about the second hinge axis when the load of the wing frame is outboard of the second hinge axis as the lever is swung upwardly about the fixed hinge axis by the thrust link under the force of the push-pull means to raise the wing frame out of its working position, the thrust link further having means which capture the outboard end of the second link to resist rotation of the wing frame on said second hinge axis in the opposite direction as the load of the wing frame approaches and moves inboard of a vertical through said second hinge axis as the push-pull means acts on the hinge lever through the thrust link to lower the wing frame about said fixed hinge to its rest position over the main frame.

2. In an agricultural implement having a tool supporting main frame and a tool supporting wing frame connected to a longitudinal side of the main frame so as to be swingable on a hinge axis between a generally horizontal tool-side-down working position outboard of the main frame and a tool-side-up rest position inboard over the main frame, the improvement wherein the main frame has upwardly and outwardly extending bracket means adjacent said longitudinal side thereof and the wing frame has bracket means adjacent said longitudinal side of the main frame which project from its tool supporting side, and there is provided a hinge lever having one end hingedly connected to the main frame bracket means so as to be swingable about a fixed hinge axis disposed above the level of the main frame and having its opposite end hingedly connected to the wing frame bracket means so as to be swingable about a second hinge axis spaced from said rigid hinge axis, horizontally extendable and retractable push-pull means connected at one end to the main frame inboard of its said side, a thrust link having one end pivotally connected to the other end of the push-pull means, the thrust link being pivotally connected to the hinge lever intermediate its hingedly connected ends, and a second link pivotally connected at one end to the wing frame bracket means, one said links containing a longitudinally extending closed slot, the other link having an anchor pin slidably confined within said closed slot, said slot being of a length such that the wing frame is free to swing on the second hinge axis to follow field contour when the wing frame is in its generally horizontal working position, said slot having one end located for engagement by the anchor pin as the push-pull means is extended to raise the wing frame out of its working position so as to support the wing frame against outboard rotation on the second hinge axis, and the thrust link further having means which resist rotation of the wing frame in the opposite direction about said second hinge axis as the load of the wing frame is shifted to the inboard side of the second hinge axis.

3. The improvement of claim 2 wherein the fixed hinge axis is spaced above the main frame and, in the working position of the wing frame, the second hinge axis is spaced below said fixed hinge axis.

4. The improvement of claim 3 wherein the wing frame, in its rest position, is disposed generally horizontal and substantially inboard of the main frame.

5. The improvement of claim 4 wherein, in its working position, the wing frame is disposed at a generally horizontal level with the main frame, and the second hinge axis on which the wing frame swings to follow field contour is spaced intermediate said wing and main frame and below said generally horizontal level of the wing and main frames.

6. The improvement of claim 2 wherein the extensible-retractable push-pull means is mounted to the underside of the main frame and the direction of its extension and retraction is confined generally horizontal.

7. The improvement of claim 2 wherein the anchor pin is fixed to the thrust link and the closed slot is in the second link and extends longitudinally thereof.

8. The improvement of claim 7 wherein the anchor pin is disposed outboard of and below the hinged connection of the thrust link to the hinge lever when the wing frame is in its working position.

9. The improvement of claim 2 wherein the means to capture the end of the second link comprises a shoulder on the thrust link against which the wing frame load is supported as the load of the wing frame shifts to the main frame side of the vertical through the second hinge axis.

10. In an agricultural implement, the combination of a main frame and a wing frame swingable between a rest position over the main frame and a working position to one side of the main frame where it is disposed in a generally horizontal alignment therewith, the main frame having upwardly projecting hinge lugs adjacent the ends of the implement and said one side of the main frame, the wing frame having correspondingly located brackets adjacent said one side of the main frame, levers at each end of the main frame having an upper end hinged to said hinge lugs to swing on a fixed first hinge axis disposed above the main frame, the wing frame brackets being hinged to the lower end of the respective levers such that the wing frame is swingable on a second hinge axis spaced from and parallel to said first hinge axis, said second hinge axis being disposed below the main frame when the wing frame is in its working position, double acting motor cylinders on the main frame adjacent the ends thereof, said motor cylinders having plungers provided with thrust bars guided horizontally and pivotally connected to the respective levers intermediate their hinged ends, and tension-compression links pivotally connected at one end to the wing frame and containing a longitudinal slot inward of their other end, the thrust bars each being connected to a respective one of said links by means of an anchor pin slidably confined within the slot thereof, said slots being of a length to accommodate limited swing of the wing frame about the second hinge axis when in its working position to follow field contour, the outboard end of the slots reacting against the anchor pins of the thrust bars to hold the wing frame at a fixed angle of the lever when the wing frame load is to the outboard side of the second hinge axis, the thrust bars further having shoulder portions which engage the outboard end of the link to support the load of the wing frame when to the inboard side of the second hinge axis such that the wing frame remains at a fixed angle to the lever as the motor cylinders are operated to swing the wing frame about the first fixed hinge axis between its working and rest positions.

11. The combination of claim 10 wherein the anchor pin is located outboard of and below the pivotal connection of the thrust bars to the levers when the wing frame is in its working position.

* * * * *

UNITED STATES PATENT OFFICE
CERTIFICATE OF CORRECTION

PATENT NO. : 4,050,523
DATED : September 27, 1977
INVENTOR(S) : Robert L. Poland It is certified that error appears in the above-identified patent and that said Letters Patent are hereby corrected as shown below:

Column 6, line 9 Change "comressible" to --compressible--

Column 8, line 36 Change "speced" to --spaced--

" line 39 Change "level" to --lever--

Column 10, line 45 Change "of" to --to--

Signed and Sealed this

Twenty-first Day of February 1978

[SEAL]

Attest:

RUTH C. MASON
Attesting Officer

LUTRELLE F. PARKER
Acting Commissioner of Patents and Trademarks